(12) United States Patent
Xu et al.

(10) Patent No.: US 11,249,608 B2
(45) Date of Patent: Feb. 15, 2022

(54) TOUCH MODULE AND TOUCH SCREEN

(71) Applicants: Hefei Xinsheng Optoelectronics Technology Co., Ltd., Hefei (CN); BOE TECHNOLOGY GROUP CO., LTD., Beijing (CN)

(72) Inventors: Jiawei Xu, Beijing (CN); Bisheng Li, Beijing (CN); Taofeng Xie, Beijing (CN); Wenjin Fan, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/835,425

(22) Filed: Mar. 31, 2020

(65) Prior Publication Data
US 2021/0149525 A1 May 20, 2021

(30) Foreign Application Priority Data
Nov. 19, 2019 (CN) .......................... 201911133349.1

(51) Int. Cl.
*G06F 3/044* (2006.01)

(52) U.S. Cl.
CPC .. *G06F 3/0446* (2019.05); *G06F 2203/04103* (2013.01); *G06F 2203/04111* (2013.01)

(58) Field of Classification Search
CPC combination set(s) only.
See application file for complete search history.

(56) References Cited

U.S. PATENT DOCUMENTS

2018/0300007 A1* 10/2018 Xu .................... G06F 3/03542
2019/0064960 A1* 2/2019 Na ..................... G06F 3/0446

* cited by examiner

*Primary Examiner* — Robin J Mishler
(74) *Attorney, Agent, or Firm* — Thomas | Horstemeyer, LLP (57) ABSTRACT

The present application provides a touch module and a touch screen. The touch module includes a first metal grid layer and a second metal grid layer. First touch electrodes are disposed in the first metal grid layer and arranged along a first direction, and each of the first touch electrodes extends along a second direction which intersects the first direction. Second touch electrodes are disposed in the second metal grid layer and arranged along the second direction, and each of the second touch electrodes extends along the first direction. The touch module further includes a first dummy electrode and a second dummy electrode, where the first dummy electrode is coupled to a part of the second touch electrode in parallel and the second dummy electrode is coupled to a part of the first touch electrode in parallel.

12 Claims, 10 Drawing Sheets

TOUCH MODULE AND TOUCH SCREEN

CROSS-REFERENCE TO RELATED APPLICATION

This application is based upon and claims priority to Chinese Patent Application No. 201911133349.1, filed on Nov. 19, 2019, the entire contents thereof are incorporated herein by reference.

TECHNICAL FIELD

The present application relates to the field of touch technology and, in particular, to a touch module and a touch screen.

BACKGROUND

Compared with an indium tin oxide (ITO) touch screen, a metal grid touch screen has various characteristics, such as low resistance and uniform capacitance. Thus, metal grid touch screens are widely used in large screens. However, as the size of such metal grid touch screen increases, the screen may have various problems, such as reduced touch sensitivity and/or touch performance.

SUMMARY

The present disclosure provides a touch module and a touch screen.

The present disclosure provides a touch module including a first metal grid layer and a second metal grid layer. A plurality of first touch electrodes are disposed in the first metal grid layer and arranged along a first direction, and each of the first touch electrodes extends along a second direction which intersects the first direction. A plurality of second touch electrodes are disposed in the second metal grid layer and arranged along the second direction, and each of the second touch electrodes extends along the first direction. The touch module further includes a first dummy electrode and a second dummy electrode, the first dummy electrode is coupled to a part of the second touch electrode in parallel, and the second dummy electrode is coupled to a part of the first touch electrode in parallel.

Further, the first dummy electrode is disposed in the first metal grid layer and is disposed between adjacent first touch electrodes, and the second dummy electrode is disposed in the second metal grid layer and is disposed between adjacent second touch electrodes.

Further, a first insulation layer is provided between the first metal grid layer and the second metal grid layer, the first dummy electrode is coupled to the part of the second touch electrode in parallel through a connection hole disposed in the first insulation layer, and the second dummy electrode is coupled to the part of the first touch electrode in parallel through the connection hole disposed in the first insulation layer.

Further, a plurality of the first dummy electrodes are disposed between two adjacent second touch electrodes and arranged along the second direction, and a plurality of the second dummy electrodes are disposed between two adjacent first touch electrodes and are arranged along the first direction.

Further, the first dummy electrode is disposed in the second metal grid layer, and is attached to or covers the part of the second touch electrode to which the first dummy electrode is coupled in parallel, and the second dummy electrode is disposed in the first metal grid layer, and is attached to or covers the part of the first touch electrode to which the second dummy electrode is coupled in parallel.

Further, a plurality of the first dummy electrodes are provided and are divided into a first type of the first dummy electrode and a second type of the first dummy electrode, wherein the first type of the first dummy electrode is disposed in the first metal grid layer, is located between adjacent first touch electrodes, and is coupled to the part of the second touch electrode in parallel through a connection hole, and the second type of the first dummy electrode is disposed in the second metal grid layer, and is attached to or covers the part of the second touch electrode to which the second type of the first dummy electrode is coupled in parallel. A plurality of the second dummy electrodes are provided and are divided into a first type of the second dummy electrode and a second type of the second dummy electrode, wherein the first type of the second dummy electrode is disposed in the second metal grid layer, is located between adjacent second touch electrodes, and is coupled to the part of the first touch electrode in parallel through the connection hole, and the second type of the second dummy electrode is disposed in the first metal grid layer, and is attached to or covers the part of the first touch electrode to which the second type of the second dummy electrode is coupled in parallel.

Further, an electrode material is not disposed in a region of the first metal grid layer toward which the second type of the first dummy electrode faces, and the electrode material is not disposed in a region of the second metal grid layer toward which the second type of the second dummy electrode faces.

Further, the first direction and the second direction are perpendicular to each other.

Further, at least one of the first dummy electrode and the second dummy electrode is in a grid metal shape.

The present disclosure provides a touch screen, including the touch module described above.

DETAILED DESCRIPTION

Example embodiments will be described in detail herein, examples of which are illustrated in the accompanying drawings. When the following description refers to the accompanying drawings, same reference numerals in different drawings represent the same or similar elements unless otherwise indicated. The implementations described in the following exemplary embodiments do not represent all implementations consistent with the present application. Rather, they are merely examples of devices consistent with certain aspects of the present application as detailed in the appended claims.

The terminology used in the present application is for describing particular embodiments only and is not intended to limit the present application. Unless otherwise defined, the technical or scientific terms used in the present application shall have the common meanings understood by those skilled in the art to which the present disclosure belongs. The terms "a," "an," or the like used in the specification and claims of the present application do not indicate a limitation on quantity, but rather indicate that there is at least one of the described component. The term "a plurality of" includes two, which is equivalent to at least two. The terms "include," "comprise," or the like mean that an element or article before "include" or "comprise" encompasses an element or article and their equivalents listed after "include" or "comprise," but does not exclude other elements or objects. The terms "connect," "couple," or the like are not limited to physical or mechanical connections, may include electrical connections, and may be direct or indirect connections. Singular forms such as "a," "said," and "the" used in the specification and the appended claims are intended to include plural forms as well, unless the context clearly indicates otherwise. It should also be understood that the term "and/or" as used herein refers to and includes any or all possible combinations of one or more of associated listed items.

Figure 1:
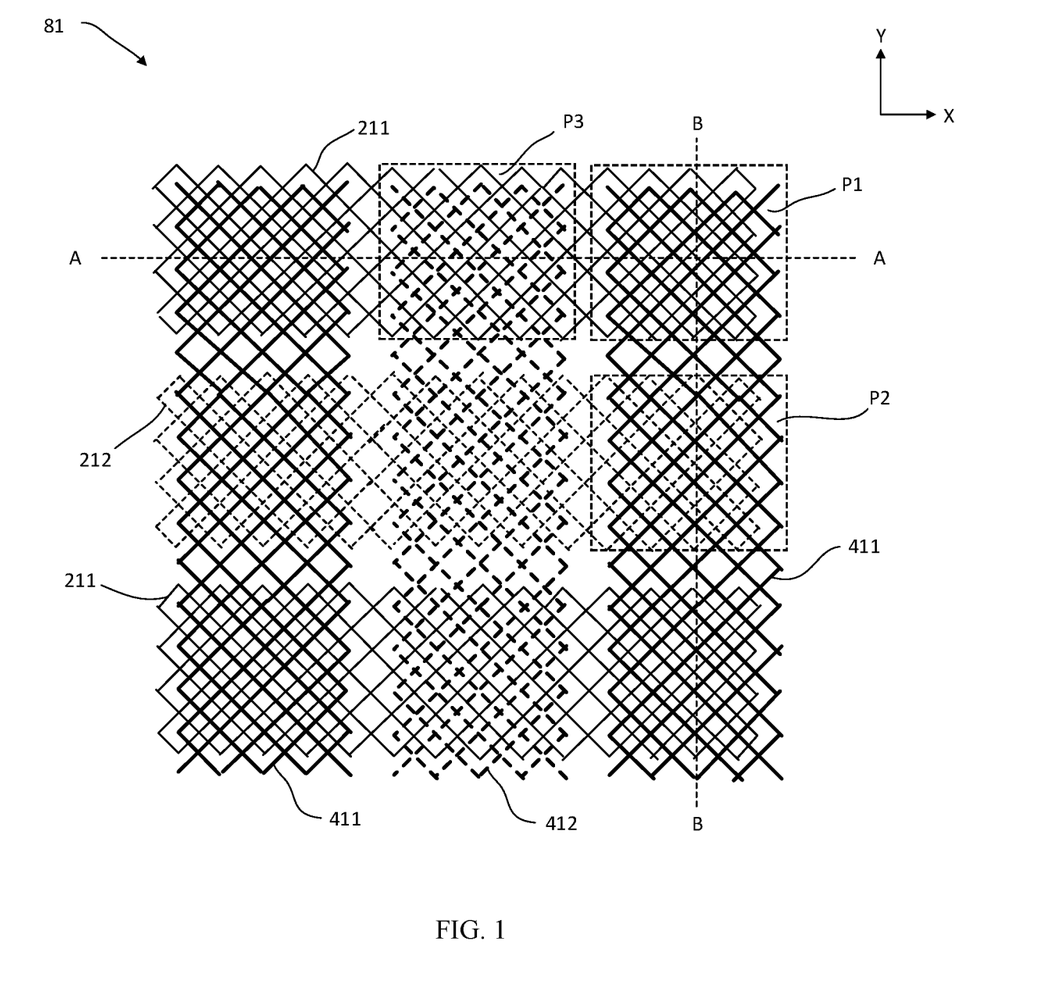
FIG. 1 is a schematic top view of a touch module (without wiring shown)
Figure 2:
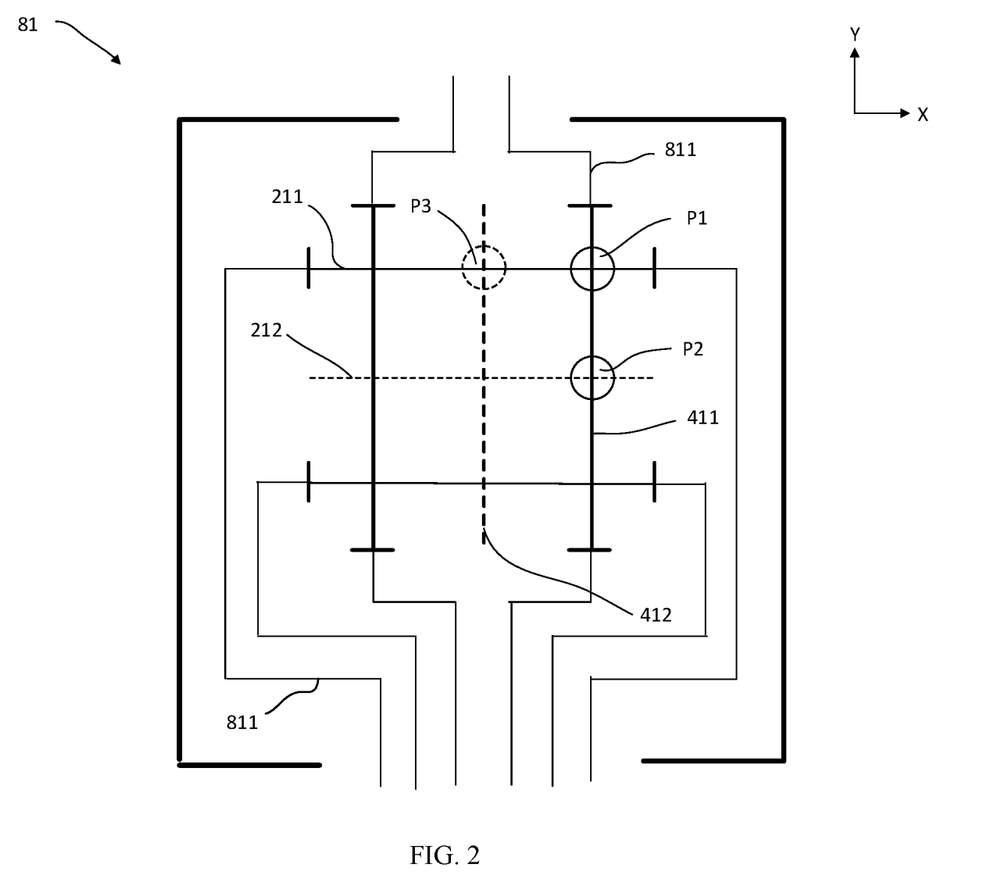
FIG. 2 is a simplified schematic view of a touch module (with wiring shown)
Figure 3:
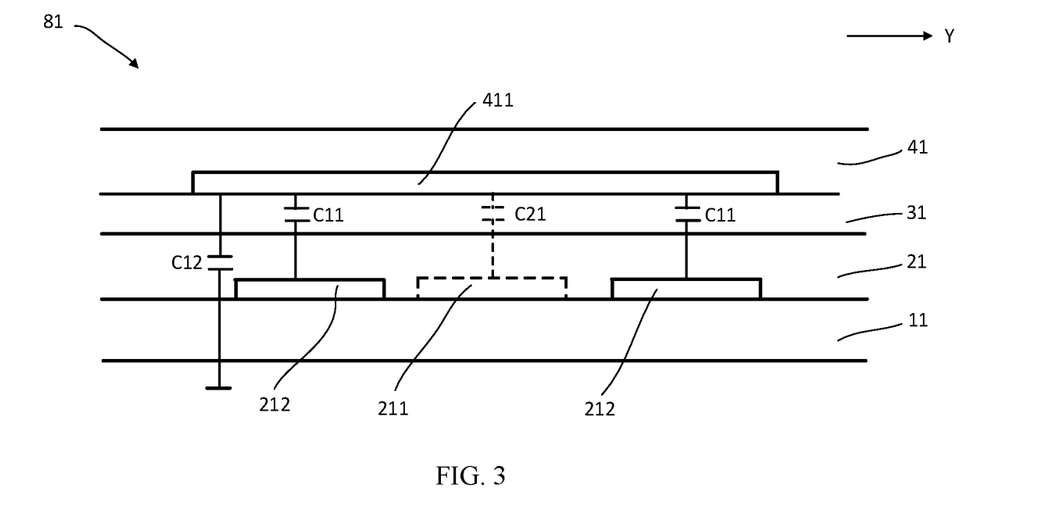
FIG. 3 is a cross-sectional view of the touch module in FIG. 1 taken along a B-B direction.
Figure 4:
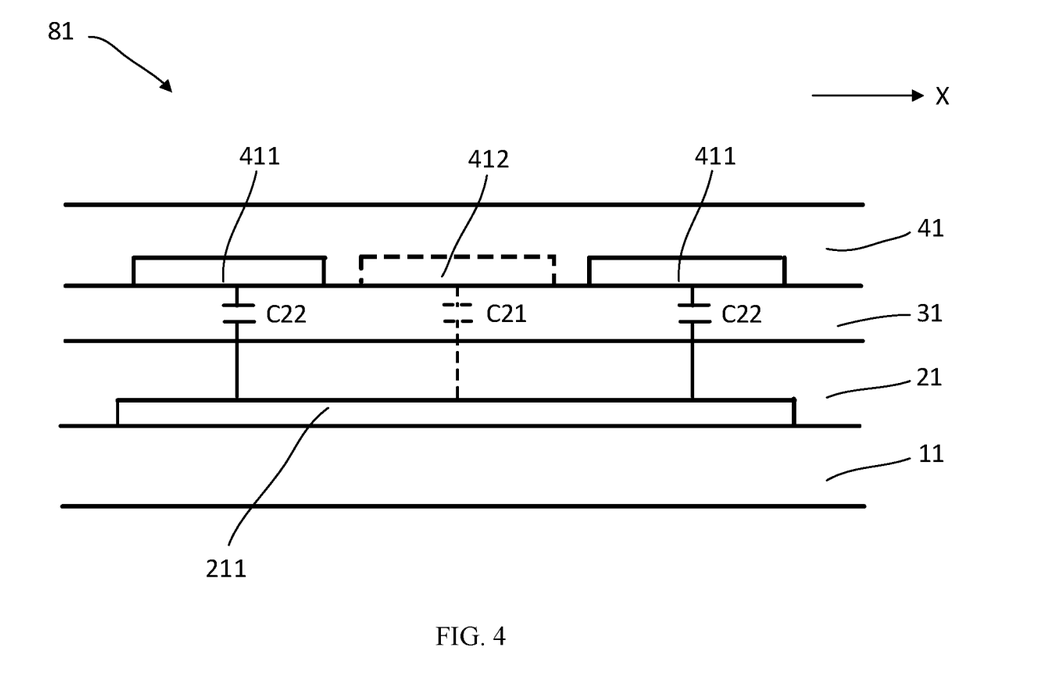
FIG. 4 is a cross-sectional view of the touch module in FIG. 1 taken along an A-A direction.

FIG. 1 is a schematic top view of a touch module (without wiring shown), FIG. 2 is a simplified schematic view of a touch module (with wiring shown), FIG. 3 is a cross-sectional view of the touch module in FIG. 1 taken along a B-B direction, and FIG. 4 is a cross-sectional view of the touch module in FIG. 1 taken along an A-A direction.

Referring collectively to FIGS. 1 to 4, a touch module 81 includes a first metal grid layer 41 and a second metal grid layer 21 for detecting a touch point on a screen. The first metal grid layer 41 and the second metal grid layer 21 are in different layers.

The first metal grid layer 41 includes a plurality of first touch electrodes 411 extending along a second direction Y and a first dummy electrode 412 adjacent to the first touch electrode 411. There is an interval between the first dummy electrode 412 and the first touch electrodes 411, and each of first touch electrodes 411 is coupled to a control circuit through a wiring 811.

The second metal grid layer 21 includes a plurality of second touch electrodes 211 extending along a first direction X and a second dummy electrode 212 adjacent to the second touch electrode 211. There is an interval between the second touch electrode 211 and the second dummy electrode 212, and each of the second touch electrodes 211 is coupled to the control circuit through the wiring 811.

The first direction X and the second direction Y intersect. The first touch electrode 411 and the second touch electrode 211 form a plurality of regions P1 where they cross and are opposite to each other. The first touch electrode 411 and the second dummy electrode 212 form a plurality of regions P2 where they cross and are opposite to each other, and the first dummy electrode 212 and the second touch electrode 411 form a plurality of regions P3 where they cross and are opposite to each other.

In a specific implementation, one of the first metal grid layer 41 and the second metal grid layer 21 is used as a touch driving layer, and the other is used as a touch sensing layer. For example, the first metal grid layer 41 is used as the touch driving layer and, correspondingly, the first touch electrode 411 is used as a touch driving electrode. Further, the second metal grid layer 21 is used as the touch sensing layer and, correspondingly, the second touch electrode 211 is used as a touch sensing electrode. With such assumption, a detection principle of a touch point on a touch screen and problems thereof are set forth in the following description.

When the touch module 81 performs a touch point detection, a driving signal with a low-voltage and a high-frequency is sequentially applied to the first touch electrodes 411, and all the second touch electrodes 211 simultaneously sense the driving signal to form a stable current. Each of the second touch electrodes 211 and the first touch electrode 411 to which the driving signal is applied at the region P1 where they cross and are opposite to each other, forms a mutual capacitance C11. When a finger touches on the screen, a new mutual capacitance C12 is formed between the finger and the touch screen at the touch point. The mutual capacitance C12 has a shunting effect on the neighboring capacitance C11, which may change the size of the capacitance C11. The amount of capacitance change of the capacitance C11 is reflected by the amount of current change on the corresponding second touch electrode 211. In each detection, only one of the driving electrodes 411 is applied with the driving signal, and only one mutual capacitance 12 is formed by the first touch electrode 411 and the each of the second touch electrode 211. Therefore, when a change of the current on a certain second touch electrode 211 is detected, it can be determined that the capacitance of the mutual capacitance C11 formed by the certain second touch electrodes 211 and the first touch electrode 411 to which the driving signal is applied at the region where they cross and are opposite to each other, has changed, and further, it can determined that there is a touch point at that position. Then, the driving signal is sequentially applied to the other first touch electrodes 411 to complete the detection of the touch point on the entire screen.

As the size of the screen increases, the length of the wiring 811 from the first touch electrode 411 and the second touch electrode 211 to the control circuit gradually increases. With the increasing of the length of the wiring 811, a circuit impedance would be increased. The first touch electrode 411 or the second touch electrode 211 closest to the control circuit has the smallest circuit impedance, and the first touch electrode 411 or the second touch electrode 211 farthest from the control circuit has the largest circuit impedance. In this case, on one hand, when the capacitance change amounts of the mutual capacitances C11 are equal to each other, since the respective circuit impedances are different, the current change amounts of the second touch electrodes 211 detected by the control circuit are different from each other, and the difference between the largest current change amount and the smallest current change amount increases as the size of the screen increases. On the other hand, the maximum current is changed. Additionally, on the other hand, when the same driving signal is applied to each of the first touch electrodes 411, attenuations of the driving signals on different first touch electrodes 411 are different and the difference between the largest signal attenuation and the smallest signal attenuation increases as the size of the screen increases. The above problems will affect uniformity of touch data and touch sensitivity, which will make it difficult to detect touch points.

In addition, when the driving signal is applied to the first touch electrode 411 serving as the touch driving electrode, the first touch electrodes 411 to which the driving signal is applied and the second dummy electrodes 212, at the plurality of overlapping regions P2 where they cross and are opposite to each other, may form parasitic capacitances C21. At the same time, after the second touch electrode 211 senses the driving signal of the first touch electrode 411, a stable current is also formed on the second touch electrode 211, and then a parasitic capacitance C22 is formed at a position where the second touch electrode 211 and the first dummy electrode 402 cross each other and are opposite to each other. The parasitic capacitances C21 and C22 may have a shunting effect on the touch driving signal and at the same time, increase the circuit impedance. As the size of the screen increases, the number of the parasitic capacitances C21 and C22 increases, and thus the circuit impedance increases, which affects the touch performance.

To solve the above problem, the present disclosure provides a new touch module 80.

Figure 5:
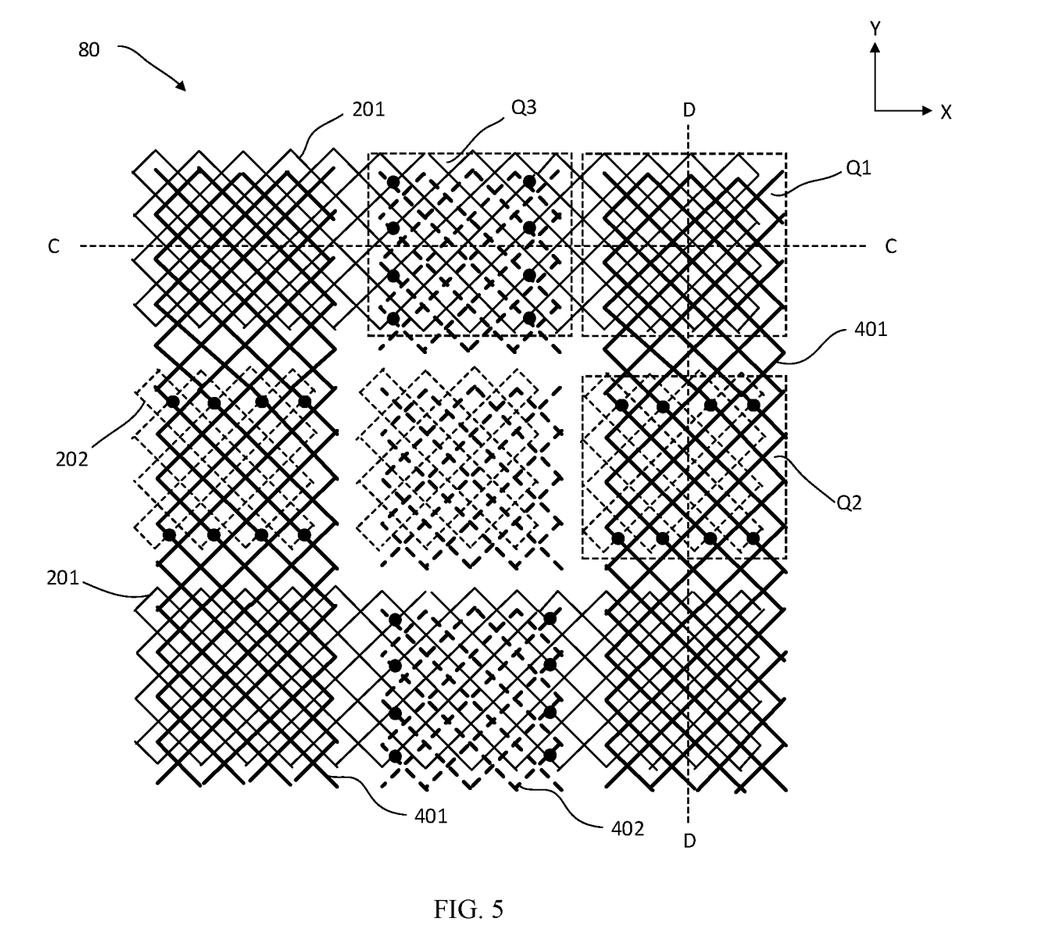
FIG. 5 is a schematic top view of a touch module (without wiring shown) according to a first embodiment of the present disclosure.
Figure 6:
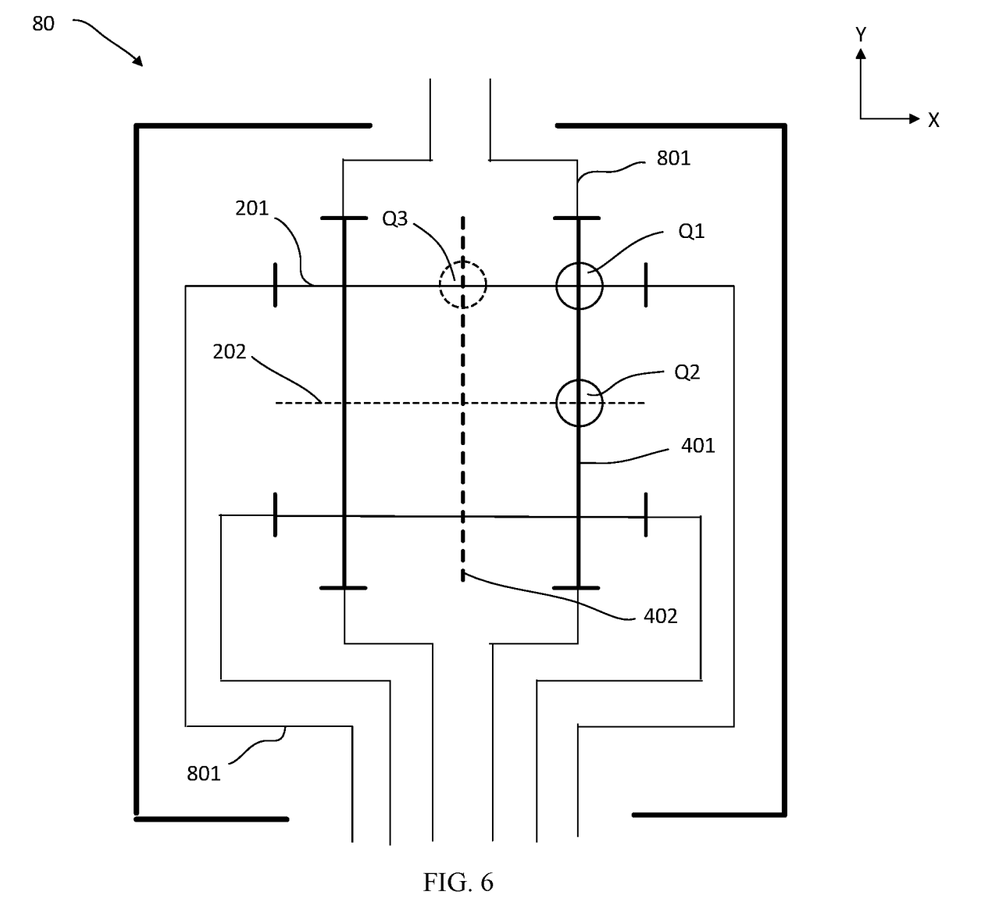
FIG. 6 is a simplified schematic view of the touch module (with wiring shown) according to the first embodiment of the present disclosure.
Figure 7:
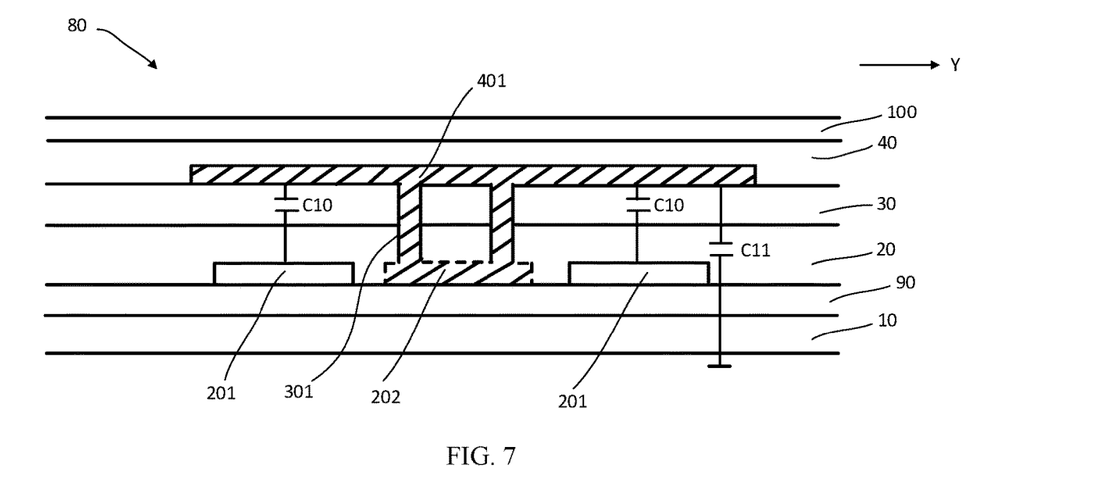
FIG. 7 is a cross-sectional view of the touch module in FIG. 5 taken along a D-D direction.
Figure 8:
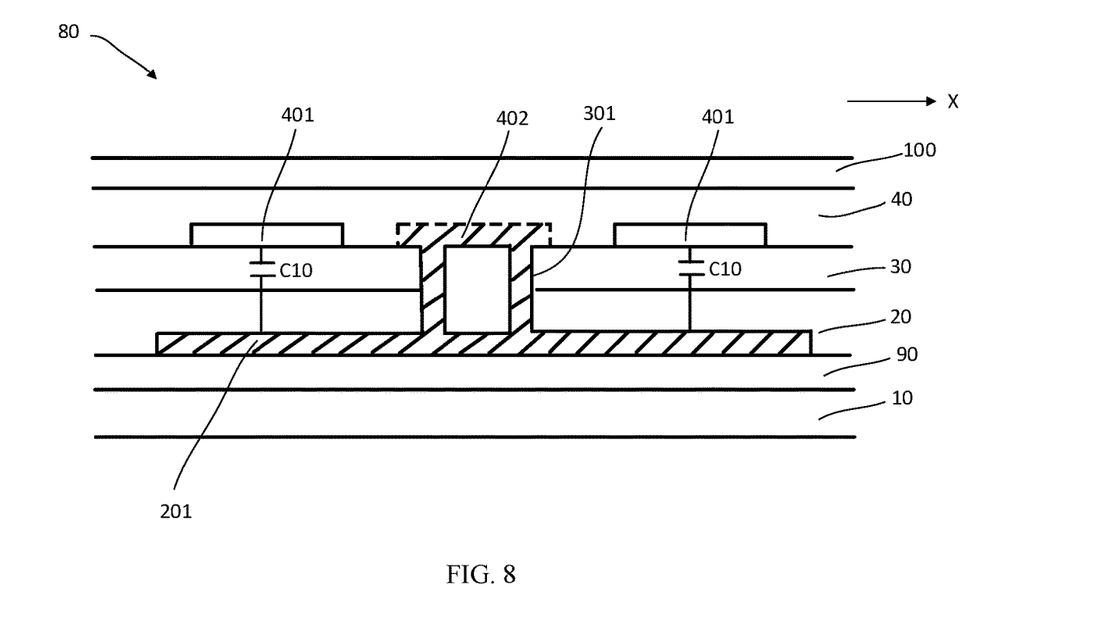
FIG. 8 is a cross-sectional view of the touch module in FIG. 5 taken along a C-C direction.

FIG. 5 is a schematic top view of a touch module (without wiring shown) according to a first embodiment of the present disclosure. FIG. 6 is a simplified schematic view of the touch module (with wiring shown) according to the first embodiment of the present disclosure. FIG. 7 is a cross-sectional view of the touch module in FIG. 5 taken along a D-D direction. Also, FIG. 8 is a cross-sectional view of the touch module in FIG. 5 taken along a C-C direction.

Referring collectively to FIGS. 5 to 8, the touch module 80 according to the first embodiment of the present disclosure includes a first metal grid layer 40 and a second metal grid layer 20. The first metal grid layer 40 and the second metal grid layer 20 are located in different layers for detecting a touch point.

The first metal grid layer 40 includes a plurality of first touch electrodes 401. The plurality of first touch electrodes 401 are arranged along a first direction X and are parallel to each other. Each of the first touch electrodes 401 extends along a second direction Y. The first metal grid layer 40 is further provided with a first dummy electrode 402 (that is, the first dummy electrode 402 is disposed on the same layer as the first touch electrode 401), and the first dummy electrode 402 is disposed between adjacent first touch electrodes 401. There is an interval between the first touch electrode 401 and the first dummy electrode 402 so that the first touch electrode 401 and the first dummy electrode 402 are electrically insulated from each other.

One or more first dummy electrodes 402 may be disposed between any two adjacent first touch electrodes 401. When a plurality of first dummy electrodes 402 are provided, the plurality of first dummy electrodes 402 may be arranged along the second direction Y. In addition, there is provided an interval between the plurality of first dummy electrodes 402, so that the plurality of first dummy electrodes 402 are electrically insulated from each other within the first metal grid layer 40.

The second metal grid layer 20 includes a plurality of second touch electrodes 201. The plurality of second touch electrodes 201 are arranged along the second direction Y and are parallel to each other. Each of the second touch electrodes 201 extends along the first direction X. The second metal grid layer 20 is further provided with a second dummy electrode 202 (that is, the second dummy electrode 202 is disposed on the same layer as the second touch electrode 201), and the second dummy electrode 202 is disposed between adjacent second touch electrodes 201. There is an interval between the second touch electrode 201 and the second dummy electrode 202, so that the second touch electrode 201 and the second dummy electrode 202 are electrically insulated from each other.

One or more second dummy electrodes 202 may be disposed between any two adjacent second touch electrodes 201. When a plurality of second dummy electrodes 202 are provided, the plurality of second dummy electrodes 202 may be arranged along the first direction X. In addition, there is provided an interval between the plurality of second dummy electrodes 202, so that the plurality of second dummy electrodes 202 are electrically insulated from each other within the second metal grid layer 20.

The first direction X and the second direction Y intersect. In an example embodiment, the first direction X is perpendicular to the second direction Y. The first touch electrode 401 and the second touch electrode 201 form a plurality of regions Q where they cross and are opposite to each other, the first touch electrode 401 and the second dummy electrode 202 form a plurality of regions Q2 where they cross and are opposite to each other, and the first dummy electrode 402 and the second touch electrode 201 form a plurality of regions Q3 where they cross and are opposite to each other.

The first dummy electrode 402 and the second touch electrode 201 are electrically coupled at a position where they cross and are opposite to each other, so that the first dummy electrode 402 is coupled in parallel to the second touch electrode 201. Specifically, as shown in FIG. 8, both ends of the first dummy electrode 402 are coupled to the second touch electrode 201 through connection holes 301, so that a part of the second touch electrode 201 (the part of the second touch electrode 201 facing toward the first dummy electrode 402) is coupled in parallel to the first dummy electrode 402.

The second dummy electrode 202 and the first touch electrode 401 are electrically coupled at a position where they cross and are opposite to each other, so that the second dummy electrode 202 is coupled in parallel to the first touch electrode 401. Specifically, as shown in FIG. 7, both ends of the second dummy electrode 202 are coupled to the first touch electrode 401 through the connection holes 301, so that a part of the first touch electrode 401 (the part of the first touch electrode 401 facing toward the second dummy electrode 202) is coupled in parallel to the second dummy electrode 202.

The second dummy electrode 202 and the first dummy electrode 402 both are coupled in parallel to the touch electrodes to reduce the resistance of the touch electrodes, and may be collectively referred to as "dummy electrodes."

In this embodiment, the first dummy electrode 402 is provided, and the first dummy electrode 402 and the second touch electrode 201 are electrically coupled at the position where they cross and are opposite to each other, so that a parasitic capacitance between the second touch electrode 201 and the first metal grid layer 40 can be reduced or eliminated. At the same time, in this embodiment, each of the second touch electrodes 201 is coupled in parallel to a plurality of first dummy electrodes 402, so that according to the resistance characteristic of a parallel circuit, the resistance of each of the second touch electrodes 201 is reduced. In addition, by controlling the number and resistance value of the first dummy electrodes 402 coupled in parallel to each of the second touch electrodes 201, the resistance values of the respective second touch electrodes 201 (including the wiring) can be equal to each other. Since the parasitic capacitance between the second touch electrode 201 and the first metal grid layer 40 has been eliminated, and the resistances of the second touch electrodes 201 are equal to each other, it can be considered that the impedances of the second touch electrodes 201 (including the wiring)) are equal to each other.

In this embodiment, the second dummy electrode 202 is provided, and the second dummy electrode 202 and the first touch electrode 401 are electrically coupled at the position where they cross and are opposite to each other, so that a parasitic capacitance between the first touch electrode 401 and the second metal grid layer 20 can be reduced or eliminated. At the same time, in this embodiment, each of the first touch electrodes 401 is coupled in parallel to a plurality of second dummy electrodes 202, so that according to the resistance characteristic of the parallel circuit, the resistance of each of the first touch electrodes 401 is reduced. In addition, by controlling the number and resistance value of the second dummy electrodes 202 coupled in parallel to each of the first touch electrodes 401, the resistance values of the respective first touch electrodes 401 (including the wiring) can be equal to each other. Since the parasitic capacitance between the first touch electrode 401 and the second metal grid layer 20 has been eliminated, and the resistances of the first touch electrodes 401 are equal to each other, it can be considered that the impedances of the first touch electrodes 401 (including the wiring)) are equal to each other.

The impedances of the first touch electrodes 401 are equal to each other, and the impedances of the second touch electrodes 201 are equal to each other, so that the driving signal attenuations on the first touch electrodes 401 or the second touch electrodes 201 can be equal to each other and the sensing signal attenuations can be equal to each other, and thus uniformity of touch data can be achieved and touch sensitivity can be improved.

In addition to the first metal grid layer 40 and the second metal grid layer 20, the touch module 80 of this embodiment may further include a substrate 10, a first insulation layer 30, a second insulation layer 90, and a third insulation layer 100, etc., as shown in FIGS. 7 and 8. The substrate 10 may be a rigid glass plate or a flexible plate. The first insulation layer 30 is disposed between the second metal grid layer 20 and the first metal grid layer 40, to insulate and isolate the second metal grid layer 20 and the first metal grid layer 40 from each other. The second insulation layer 90 is disposed on the substrate 10, the second metal grid layer 20 is disposed on a side of the second insulation layer 90 away from the substrate 10, the first metal grid layer 40 is disposed on a side of the first insulation layer 30 away from the substrate 10, and the third insulation layer 100 is disposed on a side of the first metal grid layer 40 away from the substrate 10 to protect the touch module 80. A plurality of connection holes 301 are provided in the first insulation layer 30. The plurality of connection holes 301 are provided at positions where the first touch electrode 401 and the second dummy electrode 202 cross and are opposite to each other, to couple the first touch electrode 401 and the second dummy electrode 202. The plurality of connection holes 301 are also provided at positions where the second touch electrode 201 and the first dummy electrode 401 cross and are opposite to each other, to couple the second touch electrode 201 and the first dummy electrode 401.

In some embodiments, referring to FIG. 6, the first metal grid layer 40 is used as a touch driving layer, and correspondingly, the first touch electrode 401 is used as a touch driving electrode. Each of the first touch electrodes 401 is coupled to a control circuit through a wiring 801, and the plurality of first touch electrodes 401 and the first dummy electrode 402 extend along the second direction Y. The second metal grid layer 20 is used as a touch sensing layer, and correspondingly, the second touch electrode 201 is used as a touch sensing electrode. Each of the second touch electrodes 201 is coupled to the control circuit through the wiring 801. The plurality of second touch electrodes 201 and the adjacent second dummy electrode 202 extend in parallel along the first direction X.

During operation, a low-voltage and high-frequency driving signal may be sequentially applied to the first touch electrodes 401, and the first touch electrode 401 and the second touch electrode 201, at the region Q where they cross and are opposite to each other, form a mutual capacitance C10. The first touch electrode 401 and the second dummy electrode 202 are coupled in parallel through the connection hole 301. When a finger touches on a surface of a touch screen, a mutual capacitance C11 is formed between the finger and the first touch electrode 401. The mutual capacitance C11 has a shunting effect on the neighboring mutual capacitance C10, and thus the capacitance of the mutual capacitance C10 changes, and the current amount on the second touch electrode 201 corresponding to the mutual capacitance C10 changes. The control circuit detects the second touch electrode 201 of which the current is changed, and then determines the position of the region Q1 where the second touch electrode 201 of which the current is changed and the first touch electrode 401 to which the driving signal is applied cross and are opposite to each other. The position of the region Q1 is the touch point.

Figure 9:
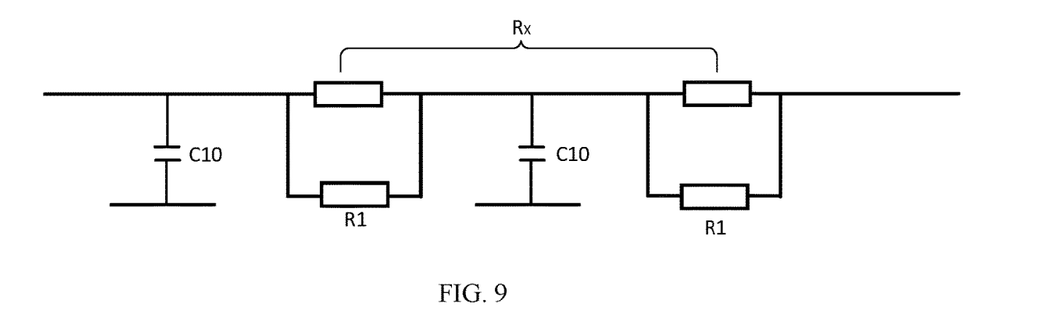
FIG. 9 is an equivalent circuit diagram of a first touch electrode in the touch module according to the first embodiment of the present disclosure.

FIG. 9 is a circuit equivalent diagram of a first touch electrode of a touch module in an embodiment of the present disclosure.

In this embodiment, n second dummy electrodes 202 are arranged along the first direction X and disposed between any two adjacent second touch electrodes 201, where n is equal to the number of the first touch electrodes 401. The n second dummy electrodes 202 located between the adjacent two second touch electrodes 201 are arranged in a row to form a second dummy electrode strip. Each of the second dummy electrodes 202 may be regarded as a segment of the second dummy electrode strip. The first touch electrodes 401 are in one-to-one correspondence with and coupled in parallel to the segments of each second dummy electrode trip along the second direction Y.

The number of the second dummy electrodes 202 to which each of the first touch electrodes 401 are coupled in parallel in the second direction Y is N, and the N is equal to the number of the second dummy electrode strips.

For the convenience of description, it is defined herein that the total resistance of the first touch electrode 401 is $R_{total}$, the wiring resistance of the first touch electrode is $R_X$, and the resistance of the second dummy electrode 202 coupled in parallel to the first touch electrode 401 is $R_1$. Therefore, the total resistance $R_{total}$ of the first touch electrode 401 is as follows:

$$1/R_{total}=1/RX+1/NR_1$$

It can be seen from the above description that the total resistance $R_{total}$ of the first touch electrode 401 in the present disclosure is smaller than the resistance $R_1$ of each of the second dummy electrodes 202, so that the resistance of the first touch electrode 401 is reduced. In addition, by controlling the number N of the second dummy electrodes 202 coupled in parallel to the first touch electrode 401, the total resistance of the first touch electrode 401 can be controlled so that the total resistances of the first touch electrodes 401 are equal to each other. For example, for a first touch electrode 401 with a large wiring resistance $R_X$, the number of the second dummy electrodes 202 coupled in parallel thereto can be increased to reduce the total resistance. For a first touch electrode 401 with a small wiring resistance $R_X$, the number of the second dummy electrodes 202 coupled in parallel thereto can be appropriately reduced. Moreover, by adjusting the resistance value of the second dummy electrode 202 coupled in parallel to each first touch electrode 401, the total resistance values of the respective first touch electrodes 401 can also be adjusted to be equal or substantially equal.

In the circuit of each first touch electrode 401, an RC load thereof is R*C. Since the parasitic capacitance between the first touch electrode 401 and the second metal grid layer 20 in the present disclosure has been eliminated, the present solution has the advantages of low impedance, controllable impedance, and equal RC load of each first touch electrode 401, so that the signal loss on each first touch electrode 401 is small, and the signal losses on the first touch electrodes 401 are equal, which improves touch performance and touch sensitivity.

Similarly, a plurality of first dummy electrodes 402 located between two adjacent first touch electrodes 401 are arranged in a column to form a first dummy electrode strip. Each of the first dummy electrodes 402 can be regarded as a segment of the first dummy electrode strip. The second touch electrode 201 is coupled in parallel to one segment of each first dummy electrode strip in the first direction X. The number of segments of each first dummy electrode strip in the second direction Y is n1, and n1 is equal to the number of the second touch electrodes 201. The second touch electrodes 201 are in a one-to-one correspondence with and coupled in parallel to the segments of each first dummy electrode strip in the first direction X. The number of the segments of the first dummy electrode strip coupled in parallel to each second touch electrode 201 in the first direction X is N1, and the N1 is equal to the number of the first dummy electrodes 202. Similar to the foregoing description of the first touch electrode 401, the second touch electrode 201 also has the advantages of low impedance and equal RC load.

The number n1 of the segments of the first dummy electrode strip in the second direction Y and the number n of the segments of the second dummy electrode strip in the first direction X are only one implementation of the present disclosure, which is not limited thereto in the present disclosure. For example, the number n1 of the segments of the first dummy electrode strip in the second direction Y may be greater than the number of the second touch electrodes 201. In this case, the second touch electrode 201 is coupled in parallel to at least two segments of at least one first dummy electrode strip in the first direction X. In another example, the number n1 of the segments of the first dummy electrode strip in the second direction Y may be smaller than the number of the second touch electrodes 201.

Figure 10:
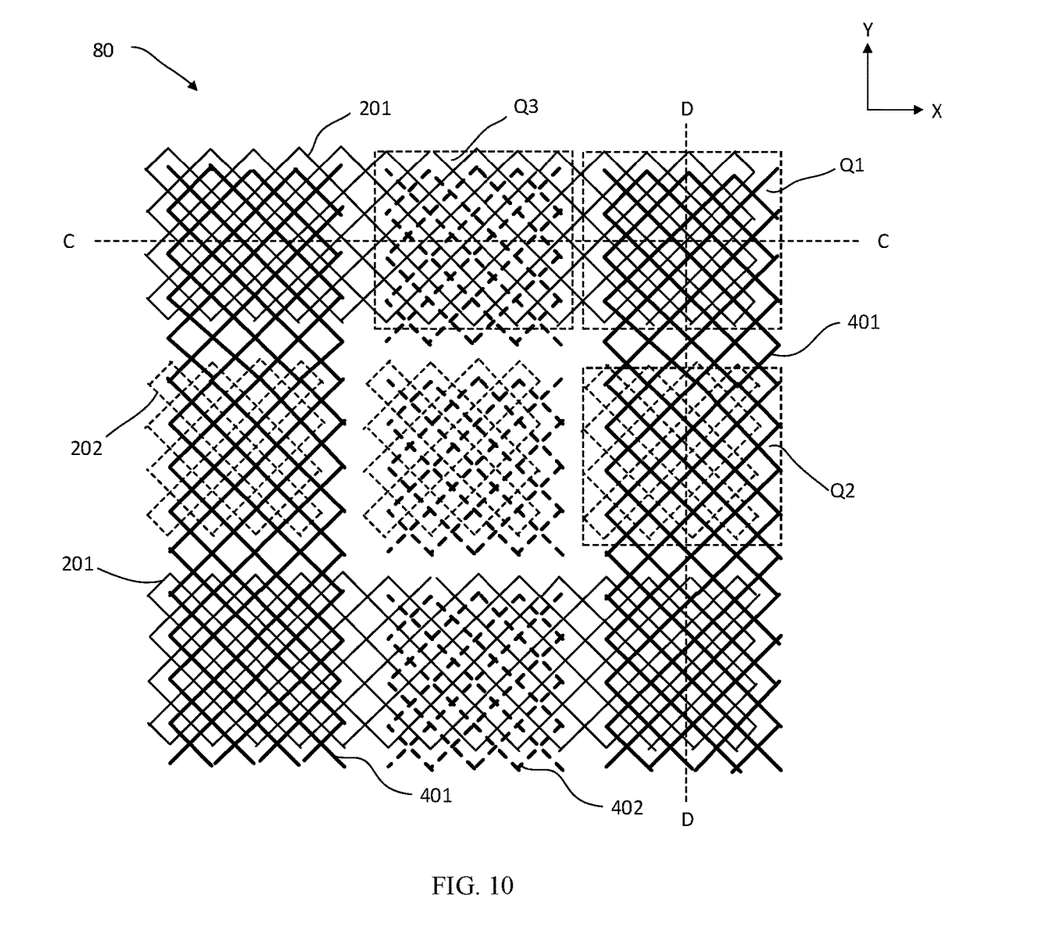
FIG. 10 is a schematic top view of a touch module according to a second embodiment of the present disclosure.
Figure 11:
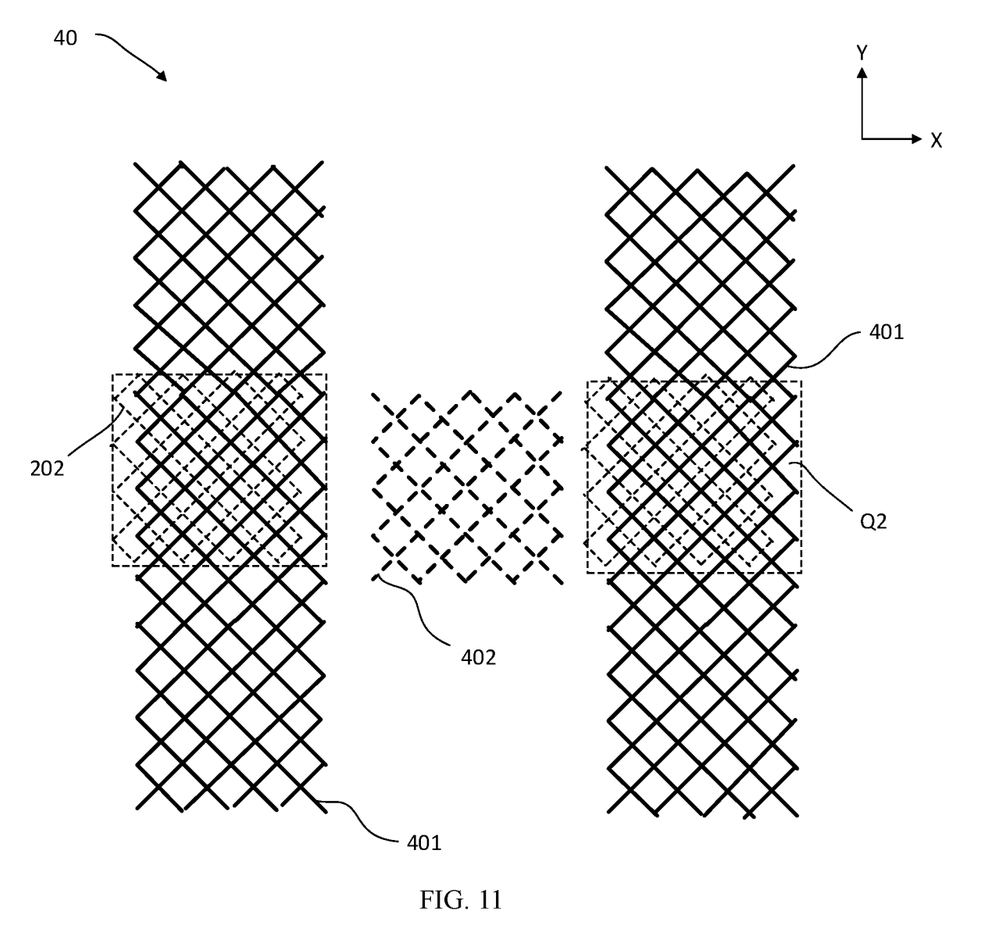
FIG. 11 is a schematic top view of a first metal grid layer of the touch module according to the second embodiment of the present disclosure.
Figure 12:
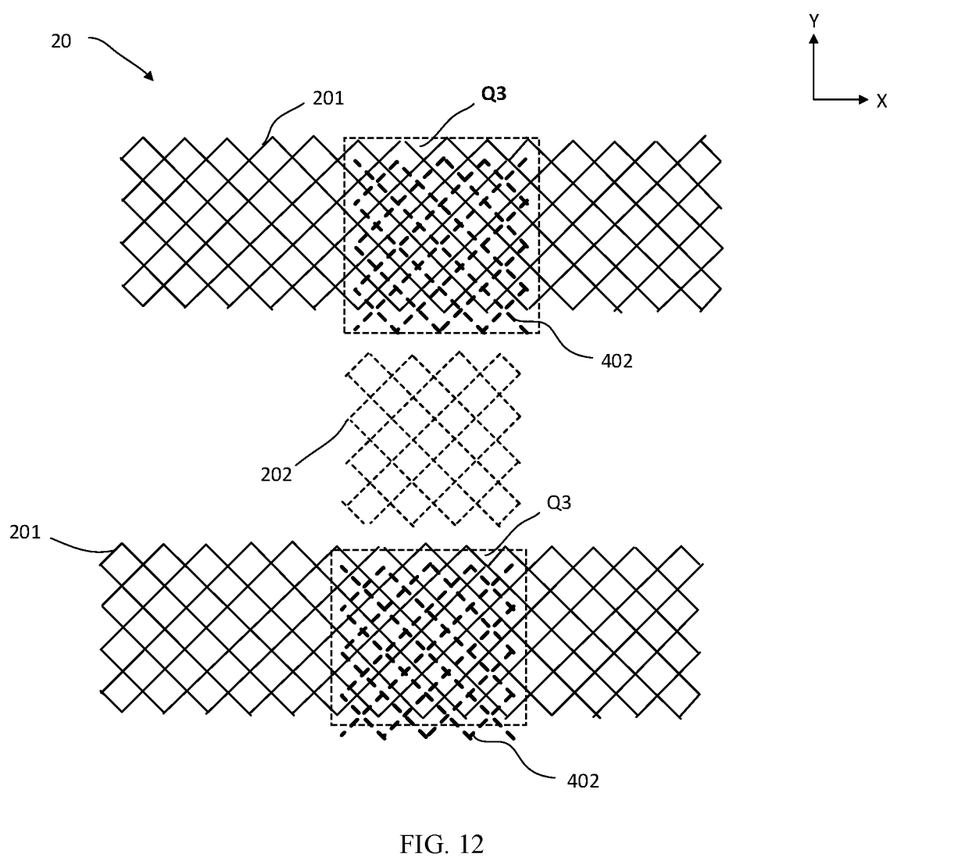
FIG. 12 is a schematic top view of a second metal grid layer of the touch module according to the second embodiment of the present disclosure.
Figure 13:
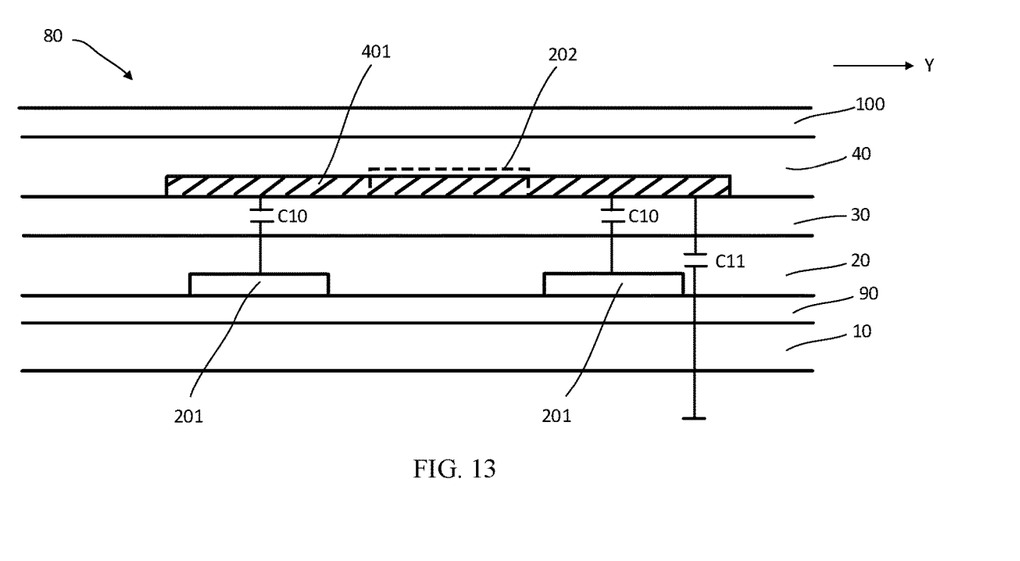
FIG. 13 is a sectional view taken along a D-D direction in FIG. 10.
Figure 14:
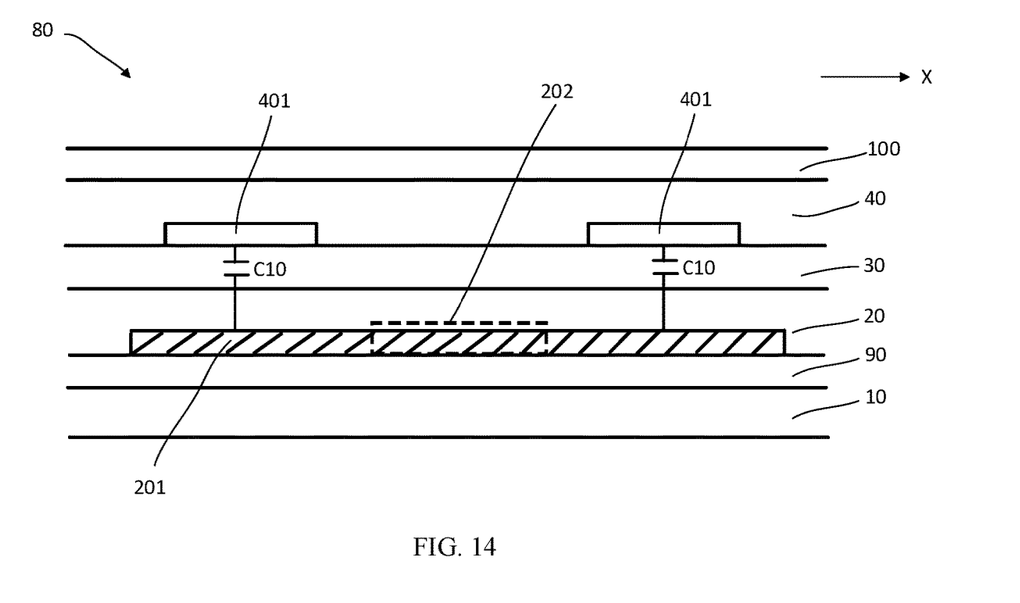
FIG. 14 is a sectional view taken along a C-C direction in FIG. 10.

FIG. 10 is a schematic top view of a touch module according to a second embodiment of the present disclosure, FIG. 11 is a schematic top view of a first metal grid layer of the touch module according to the second embodiment of the present disclosure, FIG. 12 is a schematic top view of a second metal grid layer of the touch module, FIG. 13 is a cross-sectional view taken along a D-D direction in FIG. 10, and FIG. 14 is a cross-sectional view taken along a C-C direction in FIG. 10.

Referring collectively to FIGS. 10 to 14, the touch module in the second embodiment includes a first metal grid layer 40 and a second metal grid layer 20 located in different layers.

The first metal mesh layer 40 includes a plurality of first touch electrodes 401. The plurality of first touch electrodes 401 are arranged along a first direction X and are parallel to each other. Each of the first touch electrodes 401 extends along the second direction Y.

The second metal grid layer 20 includes a plurality of second touch electrodes 201. The plurality of second touch electrodes 201 are arranged along a second direction Y and are parallel to each other. Each of the second touch electrodes 201 extends along the first direction X.

Similar to the first embodiment, the touch module of the second embodiment is also provided with a plurality of second dummy electrodes 202 coupled in parallel to the first touch electrode 401 and a plurality of first dummy electrodes 402 coupled in parallel to the second touch electrode 201, to improve impedance and parasitic capacitance.

The difference between the first embodiment and the second embodiment is as follows. In the first embodiment, all the second dummy electrodes 202 are disposed in the second metal grid layer 20, so that the first touch electrodes 401 and the second dummy electrode 202 coupled in parallel to each other are arranged in different layers, and electrically coupled through the connection hole 301. All the first dummy electrodes 402 are arranged in the first metal grid layer 40 so that the second touch electrode 201 and the first dummy electrode 402 coupled in parallel are disposed in different layers, and electrically coupled through the connection hole 301.

However in the second embodiment, the plurality of second dummy electrodes 202 coupled in parallel to the first touch electrode 401 are classified into two types. A first type of second dummy electrode 202 is disposed in the second metal grid layer 20, and is coupled in parallel to the first touch electrode 401 through a connection hole 301. The first type of second dummy electrode 202 is disposed between adjacent second touch electrodes 201. A second type of the second dummy electrode 202 is disposed in the first metal grid layer 40 on the same layer as the first touch electrode 401, and can be fabricated synchronously or asynchronously with the first touch electrode 401. The second type of the second dummy electrode 202 is attached to or covers a part of the first touch electrode 401 coupled in parallel thereto to achieve the electrical connection (parallel) therebetween. The first type of second dummy electrode 202 and the second type of second dummy electrode 202 are staggered (that is, they are not arranged in the same area), which is beneficial to improving the uniformity of the electrode distribution. Further, any electrode (metal material) may not be disposed in a region of the second metal grid layer 20 toward which the second type of second dummy electrode 202 faces to further improve the uniformity of the electrode distribution. In other embodiments, only the second type of second dummy electrode 202 may be provided without providing the first type of second dummy electrode 202.

In the second embodiment, the plurality of first dummy electrodes 402 coupled in parallel to the second touch electrode 201 are classified into two types. A first type of first dummy electrode 402 is disposed in the first metal grid layer 40, and is coupled in parallel to the second touch electrode 201 through the connection hole 301. The first type of first dummy electrode 402 is disposed between adjacent first touch electrodes 401. A second type of first dummy electrode 402 is disposed in the second metal grid layer 20 on the same layer as the second touch electrode 201, and can be fabricated synchronously or asynchronously with the second touch electrode 201. The second type of the first dummy electrode 402 is attached to or covers a part of the second touch electrode 201 coupled in parallel thereto to achieve the electrical connection (parallel) therebetween. The first type of first dummy electrode 402 and the second type of first dummy electrode 402 are staggered (that is, they are not arranged in the same area), which is beneficial to improving the uniformity of the electrode distribution. Further, any electrode (metal material) may be not disposed in a region of the first metal grid layer 40 toward which the second type of first dummy electrode 402 faces to further improve the uniformity of the electrode distribution. In other embodiments, only the second type of first dummy electrode 402 may be provided without providing the first type of first dummy electrode 402.

The first touch electrode 401 and the second touch electrode 201 form a plurality of regions Q1 where they cross and are opposite to each other, the first touch electrode 401 and the second dummy electrode form a plurality of regions Q2 where they cross and are opposite to each other, and the second touch electrode 201 and the first dummy electrode form a plurality of regions Q3 where they cross and are opposite to each other.

Similar to the first embodiment, the touch module in the second embodiment further includes a substrate 10, a first insulation layer 30, a second insulation layer 90, and a third insulation layer 100, as shown in FIGS. 13 and 14. The second insulation layer 90 is disposed on the substrate 10, and the second metal grid layer 20 is disposed on a side of the second insulation layer 90 away from the substrate 10. The first insulation layer 30 is disposed between the second metal grid layer 20 and the first metal grid layer 40 to insulate and isolate the second metal grid layer 20 and the first metal grid layer 40 from each other. The first metal grid layer 40 is disposed on a side of the second insulation layer 30 away from the substrate 10, and the third insulation layer 100 is disposed on a side of the first metal grid layer 40 away from the substrate 10 to protect the touch panel.

In the second embodiment, the first metal grid layer 40 is used as a touch driving layer, and correspondingly, the first touch electrode 401 is used as a touch driving electrode. The second metal grid layer 20 is used as a touch sensing layer and, correspondingly, the second touch electrode 201 is used as a touch sensing electrode. When a driving signal with low-voltage and high-frequency is sequentially applied to the first touch electrodes 401, all the second touch electrodes 201 sense the driving signal on the first touch electrode 401 to form a stable current in each of the second touch electrode 201. At the same time, each of the second touch electrodes 201 and the first touch electrode 401 to which the driving signal is applied, at the region Q1 where they cross and are opposite to each other, forms a mutual capacitance C10. When a finger touches on the screen, the capacitance of the mutual capacitance C10 is changed, resulting in a current change of a corresponding second touch electrode 201. The control circuit determines a touch point by detecting the current change on each second touch electrode 201, and a position where the second touch electrode 201 with the current change and the first touch electrode 401 to which the driving signal is applied cross and are opposite to each other.

In the second embodiment, after the first metal grid layer 40 and the second metal grid layer 20 overlap each other, a uniform grid distribution is formed having no effect on ghost-preventing performance.

The present disclosure also provides a touch screen, which includes the touch module 80 described above. It can be understood from the above description that the touch performance and the touch sensitivity of the touch screen including the touch module 80 are greatly improved compared with the touch screen in the prior art.

Meanwhile, the present disclosure also provides a manufacturing method of the touch module 80 or, in other words, a method of manufacturing a touch module 80, which includes:

1. coating a black photoresist material on a substrate and forming a black photoresist frame by photolithography, where the substrate may be a glass plate;

2. applying OC material on the substrate on which the black photoresist frame has been formed to cover the surface of the black photoresist frame and the surface of the substrate with the OC material, and then, forming a desired OC0 insulating layer pattern through exposure and development;

3. forming a second metal grid layer 20 on the OC0 pattern, which specifically includes: 3.1, forming a uniform metal film on the insulating layer OC0 by a magnetron sputtering technique; and 3.2, uniformly coating a photoresist layer on the metal film and forming a second touch electrode 201, a second dummy electrode 202, and a wiring 801 pattern coupled to the second touch electrode 201 of the second metal grid layer 20 through exposing, developing, etching, and the like;

4. coating OC material on the second metal grid layer 20, and then forming a desired OC1 insulating layer pattern through exposing and developing;

5. forming a first touch electrode 201, a first dummy electrode 202, and a wiring 801 pattern coupled to the first touch electrode 201 of the first metal grid layer 40 on the OC1 insulation layer, for details of which, please refer to the manufacturing of the second metal grid layer 20; and 6. coating OC material on the second metal grid layer 40, and then forming a desired OC2 insulating layer pattern for protecting the touch module through exposing and developing.

The above description is example preferred embodiments of the present application, and is not intended to limit the present application. Any modification, equivalent replacement, or improvement made within the spirit and principle of the present application shall be within the protection scope of the present application.

What is claimed is:

1. A touch module, comprising:
a first metal grid layer and a second metal grid layer, wherein:
a plurality of first touch electrodes are disposed in the first metal grid layer and arranged along a first direction, and each of the first touch electrodes extends along a second direction which intersects the first direction;
a plurality of second touch electrodes are disposed in the second metal grid layer and arranged along the second direction, and each of the second touch electrodes extends along the first direction;

the touch module further comprises a first dummy electrode and a second dummy electrode, the first dummy electrode is electrically coupled to a part of the second touch electrode in parallel, and the second dummy electrode is electrically coupled to a part of the first touch electrode in parallel;

the first metal grid layer and the second metal grid layer are of different layers in a direction perpendicular to the first and second directions;

the first dummy electrode is disposed in the first metal grid layer and is disposed between adjacent first touch electrodes; and the second dummy electrode is disposed in the second metal grid layer and is disposed between adjacent second touch electrodes.

2. The touch module according to claim 1, wherein:
a first insulation layer is provided between the first metal grid layer and the second metal grid layer;
the first dummy electrode is coupled to the part of the second touch electrode in parallel through a first connection hole disposed in the first insulation layer; and
the second dummy electrode is coupled to the part of the first touch electrode in parallel through a second connection hole disposed in the first insulation layer.

3. The touch module according to claim 1, wherein:
a plurality of the first dummy electrodes are disposed between two adjacent first touch electrodes and arranged along the second direction; and
a plurality of the second dummy electrodes are disposed between two adjacent second touch electrodes and are arranged along the first direction.

4. The touch module according to claim 1, wherein the first direction and the second direction are perpendicular to each other.

5. The touch module according to claim 1, wherein at least one of the first dummy electrode and the second dummy electrode is in a grid metal shape.

6. A touch module, comprising:
a first metal grid layer and a second metal grid layer, wherein:
a plurality of first touch electrodes are disposed in the first metal grid layer and arranged along a first direction, and each of the first touch electrodes extends along a second direction which intersects the first direction;
a plurality of second touch electrodes are disposed in the second metal grid layer and arranged along the second direction, and each of the second touch electrodes extends along the first direction;
the touch module further comprises a first dummy electrode and a second dummy electrode, the first dummy electrode is electrically coupled to a part of the second touch electrode in parallel, and the second dummy electrode is electrically coupled to a part of the first touch electrode in parallel;
the first metal grid layer and the second metal grid layer are of different layers in a direction perpendicular to the first and second directions;
the first dummy electrode is disposed in the second metal grid layer, and is attached to or covers the part of the second touch electrode to which the first dummy electrode is coupled in parallel; and
the second dummy electrode is disposed in the first metal grid layer, and is attached to or covers the part of the first touch electrode to which the second dummy electrode is coupled in parallel.

7. The touch module according to claim 6, wherein the first direction and the second direction are perpendicular to each other.

8. The touch module according to claim 6, wherein at least one of the first dummy electrode and the second dummy electrode is in a grid metal shape.

9. A touch module, comprising:
a first metal grid layer and a second metal grid layer, wherein:
a plurality of first touch electrodes are disposed in the first metal grid layer and arranged along a first direction, and each of the first touch electrodes extends along a second direction which intersects the first direction;
a plurality of second touch electrodes are disposed in the second metal grid layer and arranged along the second direction, and each of the second touch electrodes extends along the first direction;
the touch module further comprises a first dummy electrode and a second dummy electrode, the first dummy electrode is electrically coupled to a part of the second touch electrode in parallel, and the second dummy electrode is electrically coupled to a part of the first touch electrode in parallel;
the first metal grid layer and the second metal grid layer are of different layers in a direction perpendicular to the first and second directions;
a first insulation layer is provided between the first metal grid layer and the second metal grid layer;
a plurality of the first dummy electrodes are provided and are divided into a first type of the first dummy electrode and a second type of the first dummy electrode, wherein the first type of the first dummy electrode is disposed in the first metal grid layer, is located between adjacent first touch electrodes, and is coupled to a first part of the second touch electrode in parallel through a first connection hole, disposed in the first insulation layer and the second type of the first dummy electrode is disposed in the second metal grid layer, and is attached to or covers a second part of the second touch electrode to which the second type of the first dummy electrode is coupled in parallel; and
a plurality of the second dummy electrodes are provided and are divided into a first type of the second dummy electrode and a second type of the second dummy electrode, wherein the first type of the second dummy electrode is disposed in the second metal grid layer, is located between adjacent second touch electrodes, and is coupled to a first part of the first touch electrode in parallel through a second connection hole disposed in the first insulation layer, and the second type of the second dummy electrode is disposed in the first metal grid layer, and is attached to or covers a second part of the first touch electrode to which the second type of the second dummy electrode is coupled in parallel.

10. The touch module according to claim 9, wherein an electrode material is not disposed in a region of the first metal grid layer toward which the second type of the first dummy electrode faces, and the electrode material is not disposed in a region of the second metal grid layer toward which the second type of the second dummy electrode faces.

11. The touch module according to claim 9, wherein the first direction and the second direction are perpendicular to each other.

12. The touch module according to claim 9, wherein at least one of the first dummy electrode and the second dummy electrode is in a grid metal shape.

* * * * *